US012664757B2

(12) United States Patent
He et al.

(10) Patent No.:     US 12,664,757 B2
(45) Date of Patent:         Jun. 23, 2026

(54) SYSTEM AND METHOD WITH LANGUAGE-GUIDED SELF-SUPERVISED SEMANTIC SEGMENTATION

(71) Applicant: Robert Bosch GmbH, Stuttgart (DE)

(72) Inventors: Wenbin He, Santa Clara, CA (US); Suphanut Jamonnak, Santa Clara, CA (US); Liang Gou, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 18/316,690

(22) Filed: May 12, 2023

(65)                Prior Publication Data

US 2024/0378859 A1      Nov. 14, 2024

(51) Int. Cl.
  *G06K 9/00*          (2022.01)
  *G06V 10/74*          (2022.01)
          (Continued)
(52) U.S. Cl.
  CPC .......... *G06V 10/764* (2022.01); *G06V 10/761* (2022.01); *G06V 10/771* (2022.01); *G06V 10/774* (2022.01)
(58) Field of Classification Search
  CPC .......... G06N 3/045; G06N 3/08; G06N 3/084; G06N 3/088; G06N 20/00; G06N 3/044; G06N 3/047; G06N 3/04; G06N 5/022; G06N 20/20; G06N 3/0464; G06N 3/02; G06N 7/01; G06N 3/0455; G06N 3/048;

G06N 5/01; G06N 3/09; G06N 3/042; G06N 3/0895; G06N 20/10; G06N 3/0499; G06N 3/0442; G06N 3/0475; G06N 3/063;
          (Continued)

(56)                References Cited

U.S. PATENT DOCUMENTS

2019/0130220 A1*    5/2019    Zou ..................... G06F 18/2413

OTHER PUBLICATIONS

He et al., "CLIP-S4 : Language-Guided Self-Supervised Semantic Segmentation," arXiv:2305.01040v1 [cs.CV] May 1, 2023 (Year: 2023).*

(Continued)

*Primary Examiner* — Alex Kok S Liew
(74) *Attorney, Agent, or Firm* — Kathy Takeguchi; Maginot, Moore & Beck LLP

(57)                ABSTRACT
A computer-implemented system and method relates to language-guided self-supervised semantic segmentation. A modified image is generated by performing data augmentation on a source image. A machine learning model generates first pixel embeddings based on the modified image. First segment embeddings are generated using the first pixel embeddings. A pretrained vision-language model generates second pixel embeddings based on the source image. Second segment embeddings are generated by applying segment contour data from the first pixel embeddings to the second pixel embeddings after the data augmentation is performed on the second pixel embeddings. Embedding consistent loss data is generated by comparing the first segment embeddings in relation to the second segment embeddings. Combined loss data is generated that includes the embedding consistent loss data. Parameters of the machine learning model are updated based on the combined loss data.

20 Claims, 10 Drawing Sheets

(51) Int. Cl.
    *G06V 10/764*      (2022.01)
    *G06V 10/771*      (2022.01)
    *G06V 10/774*      (2022.01)

(58) Field of Classification Search
    CPC ........ G06N 3/082; G06N 5/025; G06N 3/126;
    G06N 5/02; G06N 3/006; G06N 3/049;
    G06N 3/0495; G06N 3/091; G06N 5/04;
    G06V 10/82; G06V 10/774; G06V
    10/764; G06V 10/454; G06V 10/44;
    G06V 10/25; G06V 10/7715; G06V
    10/26; G06V 20/56; G06V 40/172; G06V
    10/761; G06V 10/762; G06V 20/40;
    G06V 20/70
    See application file for complete search history.

(56)              References Cited

OTHER PUBLICATIONS

Xu, D., Ding, L., Zhou, Y. et al. GPT-ZSS: a unified zero-shot segmentation framework leveraging GPT-generated semantic embeddings and relationship alignment. Vis Comput 41, 8761-8773 (Year: 2025).*

Bau et al., "Network Dissection: Quantifying Interpretability of Deep Visual Representations," arXiv:1704.05796v1 [cs.CV], Apr. 19, 2017, pp. 1-9.
Kim et al ,"Interpretability Beyond Feature Attribution: Quantitative Testing with Concept Activation Vectors (TCAV)," arXiv: 1711.11279v5 [stat.ML], Jun. 7, 2018, 18 pages.
Hwang et al., "SegSort: Segmentation by Discriminative Sorting of Segments," arXiv: 1910.06962v2 [cs.CV], Oct. 30, 2019, 17 pages.
Zhang et al., "Self-Supervised Visual Representation Learning from Hierarchical Grouping," 34th Conference on Neural Information Processing Systems (NeurIPS 2020), Vancouver, Canada, arXiv:2012. 03044v1 [cs.CV], Dec. 5, 2020, pp. 1-12.
Gansbeke et al., "Unsupervised Semantic Segmentation by Contrasting Object Mask Proposals," arXiv:2102.06191v3 [cs.CV], Aug. 3, 2021, pp. 1-14.
He et al., "Self-supervised Semantic Segmentation Grounded in Visual Concepts," arXiv:2203.13868v2 [cs.CV], Jul. 26, 2022, 13 pages.
Zhou et al., "Extract Free Dense Labels from CLIP," arXiv:2112. 201071v2 [cs.CV], Jul. 27, 2022, 22 pages.
Radford et al., "Learning Transferable Visual Models From Natural Language Supervision," arXiv:2103.00020v1 [cs.CV], Feb. 26, 2021, pp. 1-48.

* cited by examiner

SYSTEM AND METHOD WITH LANGUAGE-GUIDED SELF-SUPERVISED SEMANTIC SEGMENTATION

FIELD

This disclosure relates generally to computer vision, and more particularly to digital image processing, visual analytics, and semantic segmentation.

BACKGROUND

In general, semantic segmentation involves partitioning an input image into semantically meaningful regions at the pixel level and assigning each region with a semantic class label. Recent advances in semantic segmentation rely heavily on pixel-wise human annotations. However, the acquisition of pixel-wise annotations is extremely labor intensive and costly. For example, pixel-wise annotations have been known to take up to 1.5 hours to label one image. Also, human annotations are often limited to predefined semantic classes, which may limit the learned models recognition capabilities to these predefined semantic classes.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below According to at least one aspect, a computer-implemented method relates to language-guided self-supervised semantic segmentation. The method includes receiving a source image. The method includes generating a modified image by performing data augmentation on the source image. The modified image is a modified version of the source image. The method includes generating, via a machine learning model, first pixel embeddings based on the modified image. The method includes generating first segment embeddings using the first pixel embeddings. The method includes generating, via a pretrained vision-language model, second pixel embeddings based on the source image. The method includes generating second segment embeddings by applying segment contour data of the first segment embeddings to corresponding clusters of the second pixel embeddings after the data augmentation is performed on the second pixel embeddings. The method includes generating embedding consistent loss data at least by comparing the first segment embeddings to the second segment embeddings. The method includes generating combined loss data that includes the embedding consistent loss data. The method includes updating parameters of the machine learning model based on the combined loss data. The method includes providing or outputting a framework for language-guided self-supervised semantic segmentation. The framework includes (i) the pretrained vision-language model and (ii) the machine learning model after the parameters have been updated.

According to at least one aspect, a system relates to language-guided self-supervised semantic segmentation. The system includes at least a processor and a non-transitory computer readable medium. The non-transitory computer readable medium is in data communication with the processor. The non-transitory computer readable medium has computer readable data including instructions stored thereon that, when executed by the processor, is configured to cause the processor to perform a method. The method includes receiving a source image. The method includes generating a modified image by performing data augmentation on the source image. The modified image is a modified version of the source image. The method includes generating, via a machine learning model, first pixel embeddings based on the modified image. The method includes generating first segment embeddings using the first pixel embeddings. The method includes generating, via a pretrained vision-language model, second pixel embeddings based on the source image. The method includes generating second segment embeddings by applying segment contour data of the first segment embeddings to corresponding clusters of the second pixel embeddings after the data augmentation is performed on the second pixel embeddings. The method includes generating embedding consistent loss data at least by comparing the first segment embeddings to the second segment embeddings. The method includes generating combined loss data that includes the embedding consistent loss data. The method includes updating parameters of the machine learning model based on the combined loss data. The method includes providing or outputting a framework for language-guided self-supervised semantic segmentation. The framework includes (i) the pretrained vision-language model and (ii) the machine learning model after the parameters have been updated.

According to at least one aspect, a non-transitory computer readable medium has computer readable data including instructions stored thereon. The computer readable data is executable by one or more processors to perform a method. The method includes receiving a source image. The method includes generating a modified image by performing data augmentation on the source image. The modified image is a modified version of the source image. The method includes generating, via a machine learning model, first pixel embeddings based on the modified image. The method includes generating first segment embeddings using the first pixel embeddings. The method includes generating, via a pretrained vision-language model, second pixel embeddings based on the source image. The method includes generating second segment embeddings by applying segment contour data of the first segment embeddings to corresponding clusters of the second pixel embeddings after the data augmentation is performed on the second pixel embeddings. The method includes generating embedding consistent loss data at least by comparing the first segment embeddings to the second segment embeddings. The method includes generating combined loss data that includes the embedding consistent loss data. The method includes updating parameters of the machine learning model based on the combined loss data. The method includes providing or outputting a framework for language-guided self-supervised semantic segmentation. The framework includes (i) the pretrained vision-language model and (ii) the machine learning model after the parameters have been updated.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
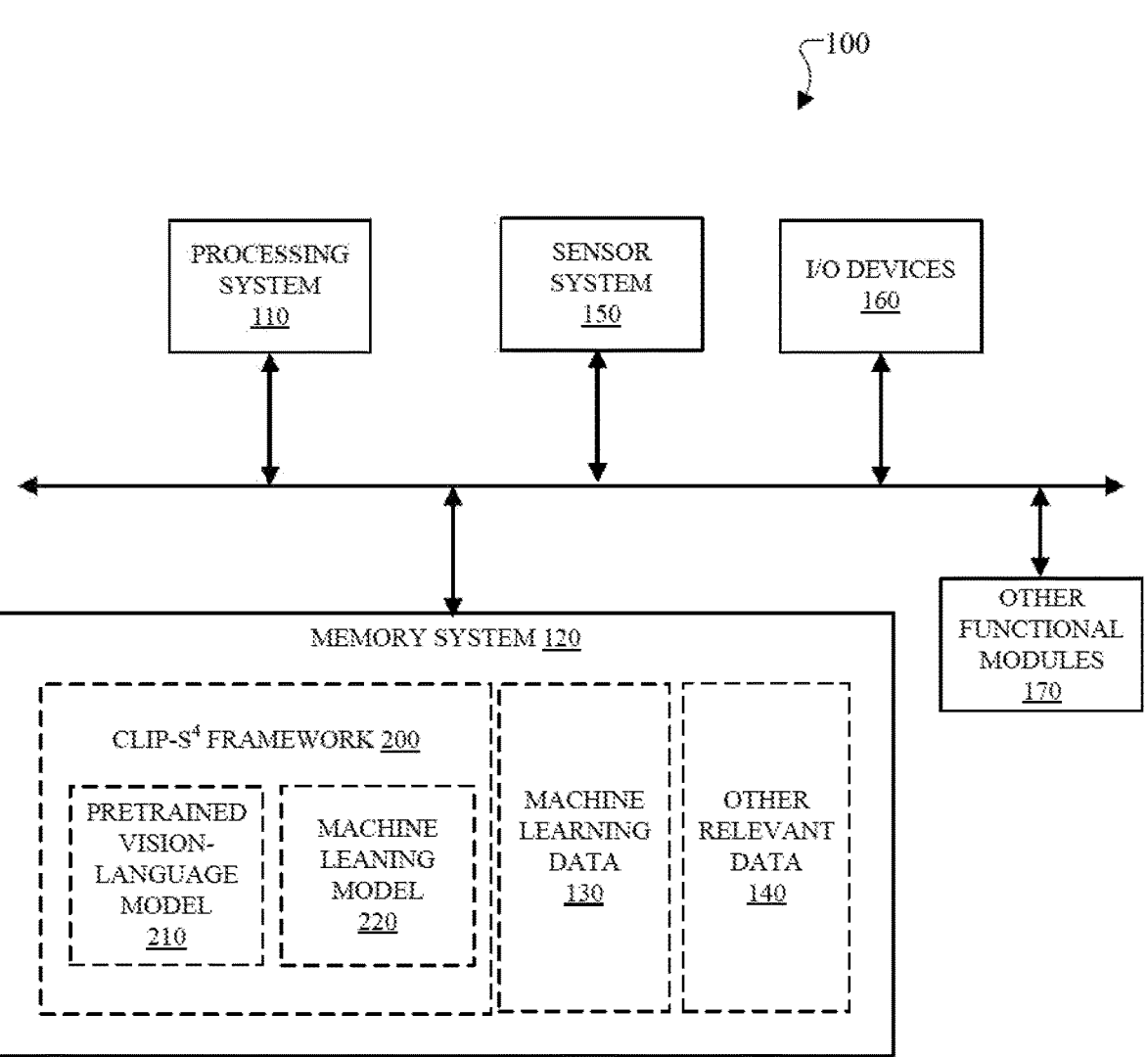
FIG. 1 is a diagram of an example of a system with a framework for language-guided self-supervised semantic segmentation according to an example embodiment of this disclosure.

FIG. 1 is a diagram of a non-limiting example of a system 100 with a framework 200, which is configured for language-guided self-supervised semantic segmentation ("CLIP-S⁴"). The framework 200 is configured to learn consistent pixel embeddings with respect to visual and conceptual semantics using self-supervised learning and the guidance of a pretrained vision-language model 210, e.g. contrastive language-image pre-training (CLIP). The framework 200 provides a self-supervised semantic segmentation approach that combines pixel-segment contrastive learning with the guidance of a pretrained vision-language model 210. The framework 200 is configured to generate high-quality pixel embeddings without any human annotations. The framework 200 is applicable to a variety of semantic segmentation tasks (e.g., language-driven semantic segmentation for both known and unknown classes, unsupervised semantic segmentation with k-means clustering/linear classification, transfer learning of generated pixel embeddings for instance mask tracking, etc.). Also, the framework 200 provides language-driven semantic segmentation without any human annotations by introducing and addressing a new task of class-free semantic segmentation. Instead of assuming that all class names are known during training, the framework 200 is advantageous in being configured to discover unknown classes from unlabelled image data without even knowing unknown class names.

The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 may include electrical, electronic, magnetic, optical, semiconductor, electromagnetic, or any suitable storage technology that is operable with the framework 200. For instance, in an example embodiment, the memory system 120 may include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the framework 200, the memory system 120 is local, remote, or a combination thereof (e.g., partly local and partly remote). For example, the memory system 120 may include at least a cloud-based storage system (e.g. cloud-based database system), which is remote from the processing system 110 and/or other components of the framework 200.

Figure 2A:
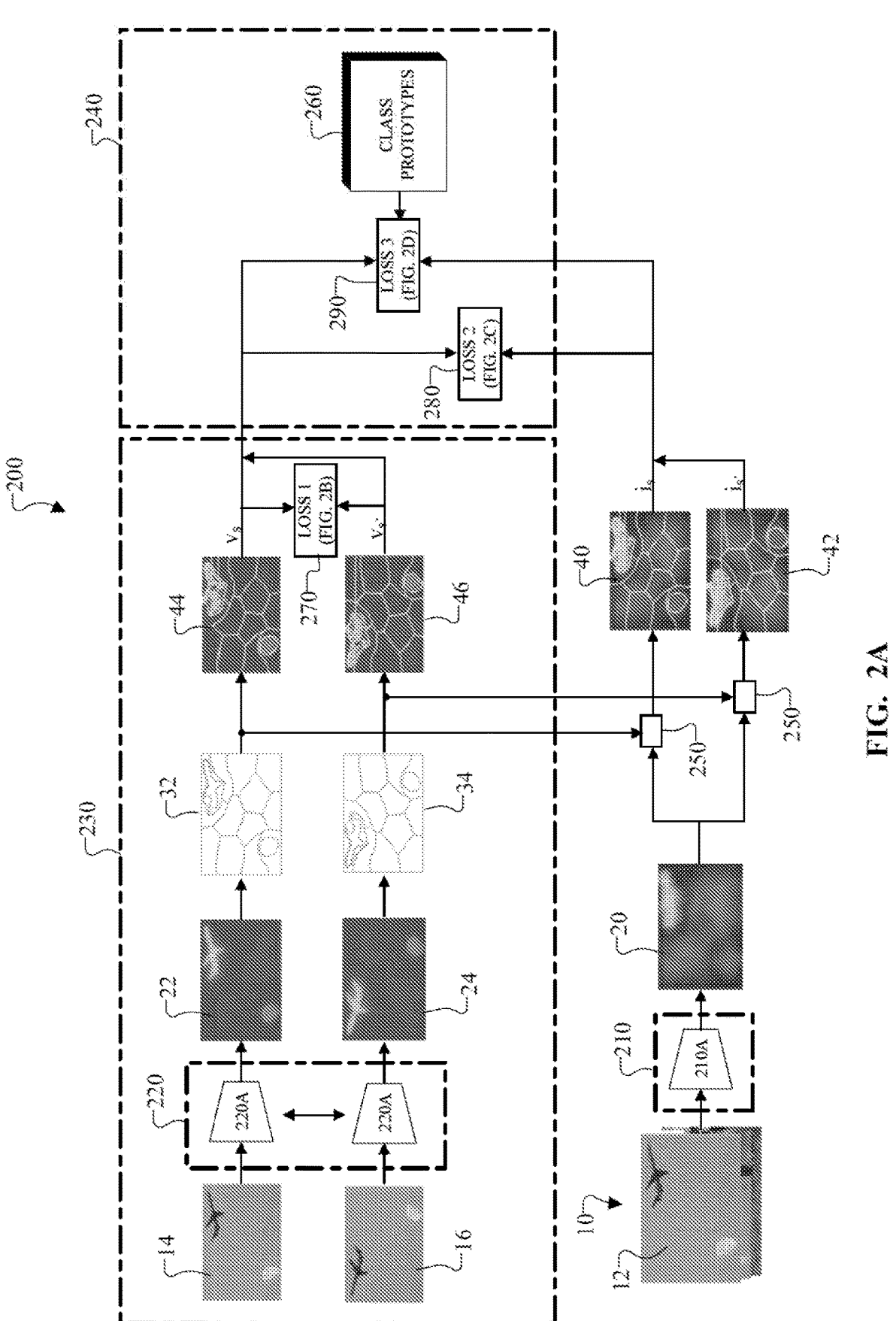
FIG. 2A is a flow diagram that illustrates aspects of training the framework of FIG. 1 according to an example embodiment of this disclosure.
Figure 3:
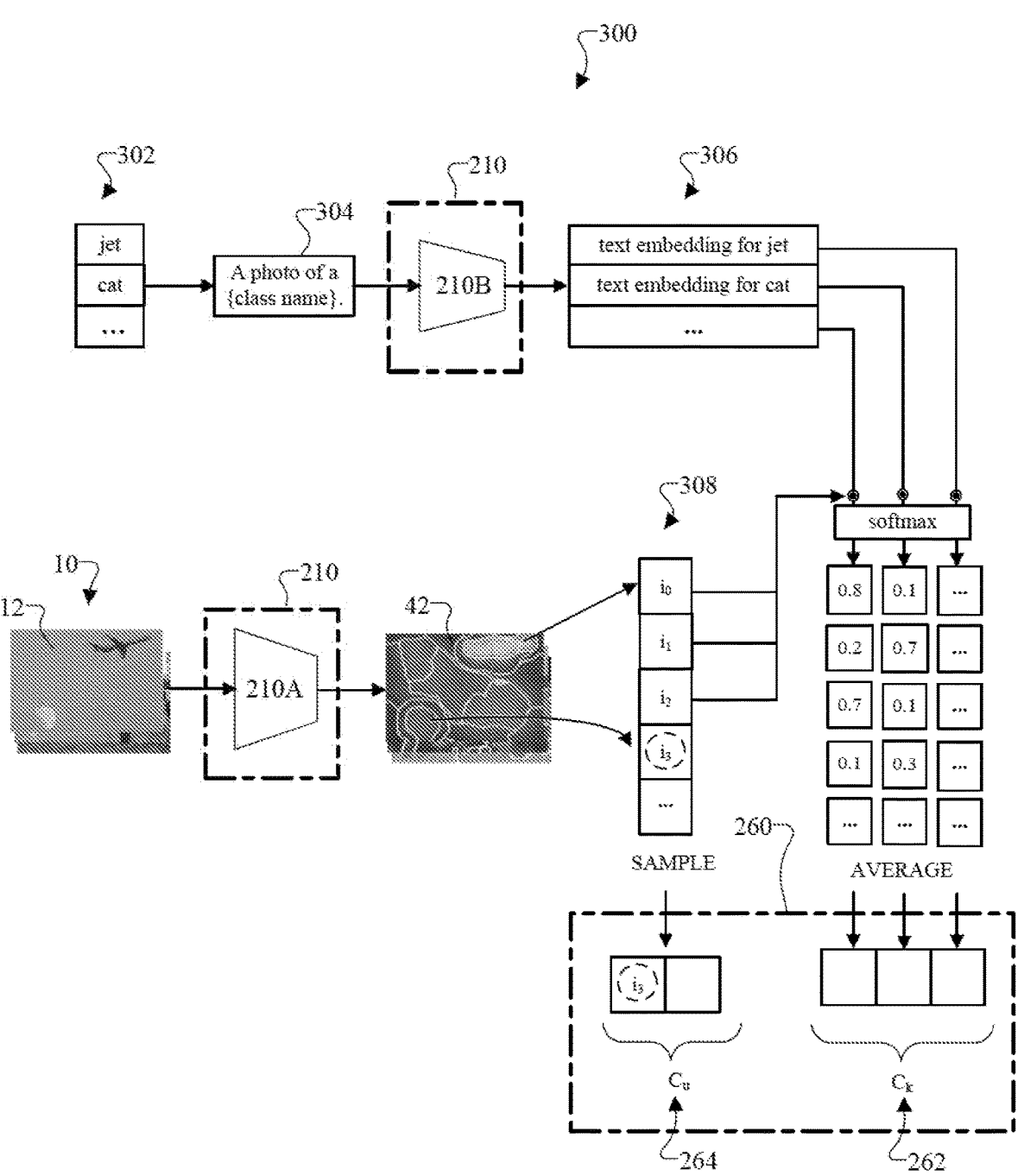
FIG. 3 is a diagram of a non-limiting example that illustrates aspects of computing target class prototypes according to an example embodiment of this disclosure.
Figure 5:
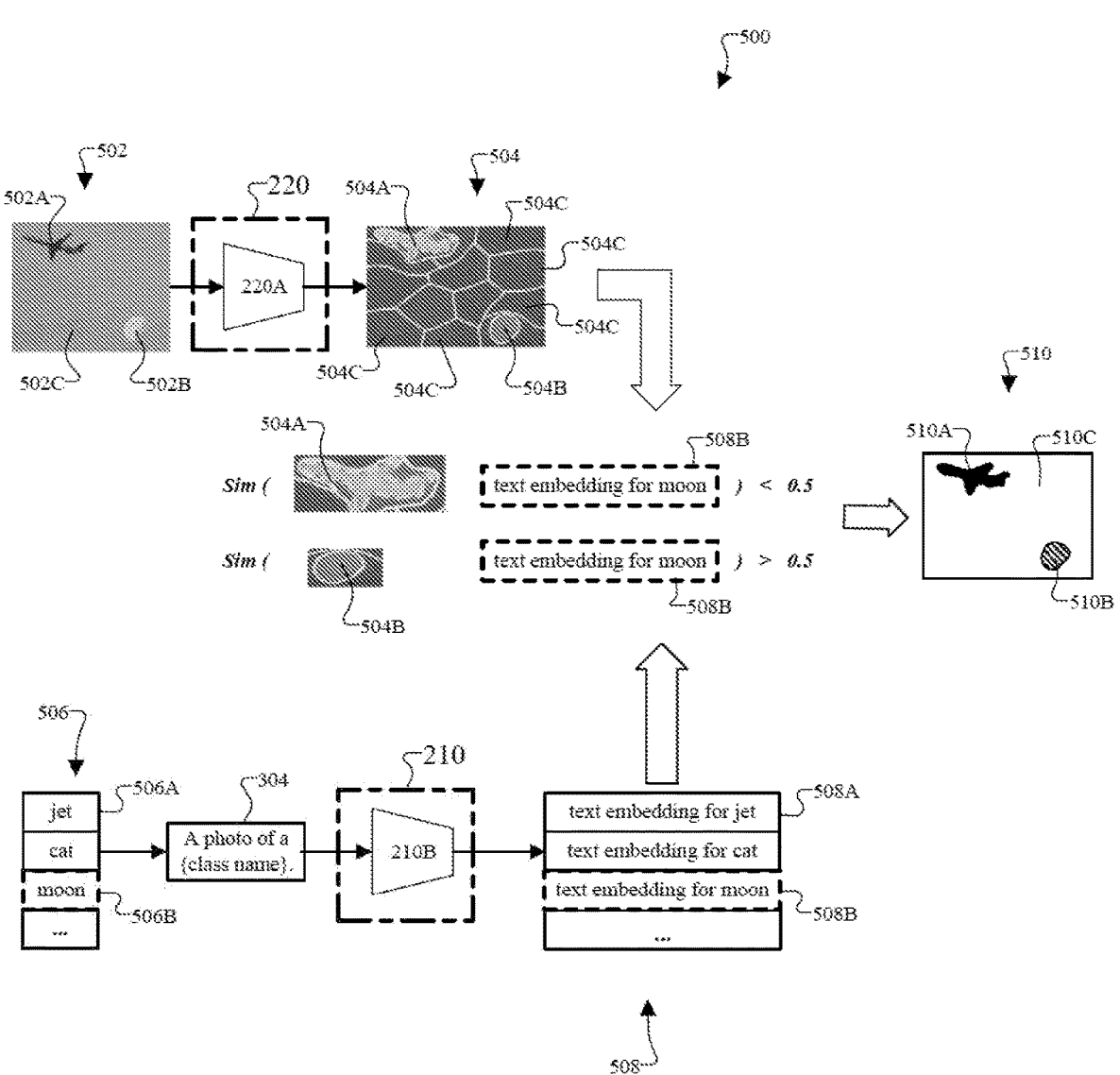
FIG. 5 is a diagram of a non-limiting example that illustrates various aspects of the framework of FIG. 2A during inference according to an example embodiment of this disclosure.

The memory system 120 includes at least a framework 200, machine learning data 130, and other relevant data 140, which are stored thereon. More specifically, the framework 200 includes computer readable data with instructions, which, when executed by the processing system 110, is configured to provide and implement language-guided self-supervised semantic segmentation via the framework 200. The computer readable data may include instructions, code, routines, various related data, any software technology, or any number and combination thereof. The framework 200 includes at least one pretrained vision-language model 210 and at least one machine learning model 220. The pretrained vision-language model 210 is pretrained to perform image classification with open vocabulary classes. For example, the pretrained vision-language model 210 includes Pyramid Scene parsing network (PSPNet or a semantic segmentation model that utilizes a pyramid parsing module) with a dilated residual neural network (e.g., ResNet50 or a convolutional neural network with 50 layers). For example, the pretrained vision-language model 210 includes CLIP. In FIG. 2A, for instance, the pretrained vision-language model 210 includes a modified image encoder 210A (e.g., MaskCLIP), which is configured to directly extract pixel embeddings correlated with texts from the pretrained vison-language model 210 (e.g., CLIP). Also, as shown in FIG. 3 and FIG. 5, the pretrained vision-language model 210 includes a text encoder 210B, which is configured to generate text embeddings as output in response to receiving one or more text/character data (e.g., class names) as input.

In addition, the machine learning model 220 is configured to generate pixel embeddings as output upon receiving at least one digital image as input. The machine learning model 220 includes at least a convolutional neural network (CNN), any suitable encoding network, any suitable artificial neural network model, or any number and combination thereof. For example, in FIG. 2A, the machine learning model 220 includes at least one encoder 220A. Also, the machine learning data 130 includes sensor data, source image data, various augmentation image data, various augmentation data, various class prototype data, various loss data, various weight data, various parameter data, and any relevant data that enables the framework 200 to learn and/or execute language-guided self-supervised semantic segmentation, as described in this disclosure. Meanwhile, the other relevant data 140 provides various data (e.g. operating system, etc.), which enables the framework 200 to perform the functions as discussed herein.

The system 100 may include at least one sensor system 150. The sensor system 150 includes one or more sensors. For example, the sensor system 150 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any number and combination thereof. The sensor system 150 is operable to communicate with one or more other components (e.g., processing system 110 and memory system 120) of the system 100. For example, the sensor system 150 may provide sensor data, which is then used by the processing system 110 to generate image data (e.g., digital images) based on the sensor data. In this regard, the processing system 110 is configured to obtain the sensor data directly or indirectly from one or more sensors of the sensor system 150. The sensor system 150 is local, remote, or a combination thereof (e.g., partly local and partly remote). Upon receiving the sensor data, the processing system 110 is configured to process this sensor data and/or generate image data (e.g., digital images) in connection with the framework 200, the machine learning data 130, the other relevant data 140, any suitable software and/or hardware components, or any number and combination thereof.

In addition, the system 100 may include at least one other component. For example, as shown in FIG. 1, the memory system 120 is also configured to store other relevant data 140, which relates to operation of the framework 200 in relation to one or more components (e.g., sensor system 150, I/O devices 160, and other functional modules 170). In addition, the system 100 is configured to include one or more I/O devices 160 (e.g., display device, keyboard device, speaker device, etc.), which relate to the framework 200. Also, the system 100 includes other functional modules 170, such as any appropriate hardware, software, or combination thereof that assist with or contribute to the functioning of the framework 200. For example, the other functional modules 170 include communication technology that enables components of the system 100 to communicate with each other as described herein. In this regard, the system 100 is operable to at least train, employ, and/or deploy the framework 200 for language-guided self-supervised semantic segmentation, as described herein.

FIG. 2A, FIG. 2B, FIG. 2C, and FIG. 2D illustrate various aspects of an example of the framework 200 for language-guided self-supervised semantic segmentation (hereinafter referred to as CLIP-S$^4$), where "CLIP" refers to contrastive language-image pre-training ("CLIP") and "S$^4$" refers to the "self-supervised semantic segmentation." As aforementioned, the framework 200 includes a pretrained vision-language model 210 and a machine learning model 220. One or more processors of the processing system 110 are configured to execute the framework 200.

In an example embodiment, the pretrained vision-language model 210 includes at least one CLIP model. In this regard, the framework 200 directly uses the pretrained vision-language model, which is pre-trained for classification tasks. For example, in FIG. 2A, the framework 200 includes at least a modified image encoder 210A (e.g. MaskCLIP) of the pretrained vision-language model 210 (e.g., CLIP). The modified image encoder 210A is configured to directly extract pixel embeddings correlated with texts from the pretrained vison-language model 210 (e.g., the CLIP model). In addition, the framework 200 includes at least a text encoder 210B (FIG. 3 and FIG. 5). The pretrained vision-language model 210 is configured to receive a training dataset of training images 10, which include source images 12. The source images 12 refer to the "original images" of the training dataset and/or the training images 10 without any data augmentation (e.g., flipping, cropping, etc.). In this example, the source images 12 are digital images. As a non-limiting example, in FIG. 2A, the source image 12 is a digital image that displays a jet and a moon with respect to a background of a sky. In this regard, as shown in FIG. 2A, the modified image encoder 210A is configured to generate pixel embeddings as output in response to receiving one or more digital images (e.g., source image 12) as input.

Also, the machine learning model 220 is configured to generate pixel embeddings as output upon receiving one or more digital images (e.g., image 14 and image 16) as input. In this regard, the machine learning model 220 is configured to map image data into pixel embeddings for semantic segmentation. For example, in FIG. 2A, the machine learning model 220 includes a Siamese encoding network. The machine learning model 220 includes at least one encoder 220A. The encoder 220A may comprise a convolutional neural network (CNN), any suitable encoding network, any suitable machine learning model, or any number and combination thereof.

FIG. 2A illustrates an example of the framework 200, which involves at least the following two components: (i) a self-supervised contrastive learning component 230 and (ii) a vision-language model guided consistency component 240. Specifically, the self-supervised contrastive learning component 230 forces pixel embeddings to be consistent within visually coherent regions and among different augmented views (e.g., image 14 and image 16) of the same source image 12 via a first loss component 270 of the machine learning model 220. For example, in FIG. 2A, the self-supervised contrastive learning component 230 includes at least a first loss component 270 to achieve this contrastive consistency.

The vision-language model guided consistency component 240 introduces (i) embedding consistency, via a second loss component 280 of the machine learning model 220, such that the pixel embeddings generated by the machine learning model 220 are aligned with the joint feature space of texts and images provided by the pretrained vision-language model 210 (e.g., CLIP) and (ii) semantic consistency, via a third loss component 290 of the machine learning model 220, such that the machine learning model 220 is forced to make the same predictions as the pretrained vision-language model 210 for a set of target classes with both known class prototypes 262 and unknown class prototypes 264. For known classes, the known class prototypes 262 are pre-computed and fixed during training. For unknown classes, the unknown class prototypes 264 are learned during training via clustering. In this regard, the self-supervised contrastive learning component 230 and the vision-language model guided consistency component 240 are complementary to each other. These two components improve pixel embedding quality and enable language-driven semantic segmentation for both known classes (e.g., a set of classes that are predefined and used by the framework 200 as a set of text embeddings during training) and unknown classes (e.g., another set of classes that are not predefined and are thus learned by the framework 200 during training).

In FIG. 2A, the framework 200 segments digital images by having the machine learning model 220 learn a pixel embedding function with (i) self-supervised contrastive learning and (ii) the guidance of a pretrained vision-language model 210 (e.g., CLIP). The framework 200 uses self-supervised contrastive learning to force the consistency of pixel embeddings within visually coherent regions (e.g., superpixels) and among different augmented views (e.g., image 14 and image 16) obtained from the same source image 12. The framework 200 introduces two vision-language model guided consistency components (i.e., embedding consistency and semantic consistency) to further regularize the machine learning model 220. These two components are complementary to each other. Also, contrastive learning mitigates the noise introduced by the pretrained vision-language model 210 (e.g., CLIP). In addition, with the knowledge extracted from the pretrained vision-language model 210 (e.g., CLIP), the framework 200 is configured to improve the quality of the pixel embeddings. The framework 200 is configured to perform language-driven semantic segmentation with target class prototypes 260, which include both known class prototypes 262 and unknown class prototypes 264.

The framework 200 trains a pixel embedding function to generate consistent pixel embeddings within visually coherent regions through pixel-segment contrastive learning. Specifically, the framework 200 employs an embedding function that transforms each pixel p of a digital image to a unit-length embedding vector $z_p$ of dimension d via a deep neural network, such as the machine learning model 220. For example, in FIG. 2A, the machine learning model 220 generates a set of pixel embeddings, as shown in image 22, based on the pixels of the image 14. Specifically, the encoder 220A generates pixel embeddings as output upon receiving the image 14 as input. In this regard, the image 22 is provided as a visualization of the pixel embeddings, which are generated by the machine learning model 220 (e.g., the encoder 220A) based on the image 14. The image 14 is a modified version of the source image 12 based on data augmentation. As a non-limiting example, in FIG. 2A, the image 14 is generated at least by performing colored space transformations the source image 12 such that the image 14 is a different colored version of the source image 12.

In addition, the machine learning model 220 generates a set of pixel embeddings, as shown in image 24, based on the image 16. Specifically, the encoder 220A generates pixel embeddings as output upon receiving the image 16 as input. In this regard, the image 24 is provided as a visualization of the pixel embeddings, which are generated by the machine learning model 220 (e.g., the encoder 220A) based on the image 16. The image 16 is another modified version of the source image 12 based on data augmentation. As a non-limiting example, in FIG. 2A, the image 16 is generated at least by performing a flipping operation on the source image 12 such that the image 16 is a flipped version of the source image 12.

The framework 200 then partitions the pixel embeddings into |S| segments by clustering the pixel embeddings into a set of clusters. For example, in FIG. 2A, with respect to the pixel embeddings, which is shown in image 22, the framework 200 generates a set of clusters, as defined by segment contour data and as shown by the cluster outlines shown in image 32. In FIG. 2A, the image 32 is provided as a visualization of the segment contour data, which is generated based on the pixel embeddings that are shown in image 22. Also, with respect to the pixel embeddings of image 24, the framework 200 generates a set of clusters, which is defined by segment contour data and which is shown by the cluster outlines shown in image 34. In FIG. 2A, the image 34 is provided as a visualization of the segment contour data, which is generated based on the pixel embeddings that are shown in image 24. In addition, the framework 200 calculates an embedding $v_s$ of each segment s (or an embedding segment) as being the average of the pixel embeddings such that $v_s = \Sigma_{p \in s} z_p / |s|$, which is also normalized into a unit-length vector $\bar{v}_s = v_s / \|v_s\|$.

Also, for each pixel p, the segments are grouped into two sets, which include a positive set $S^+$ and a negative set $S^-$. The positive set $S^+$ of a pixel contains segments within the same visually coherent region of the pixel. The visually coherent region can be derived from super-pixels or contours. As aforementioned, the framework 200 uses data augmentation (e.g., random resizing, cropping, flipping, color jittering, Gaussian blurring, etc.) to generate consistent pixel embeddings between different augmented views (e.g., image 14 and image 16) of the same source image 12. Hence, segments within the same visually coherent region of the pixel in any of the augmented views are considered as the positive set $S^+$. Other segments in the image and other segments from other images in the same batch are included in the negative set $S^-$.

Figure 2B:
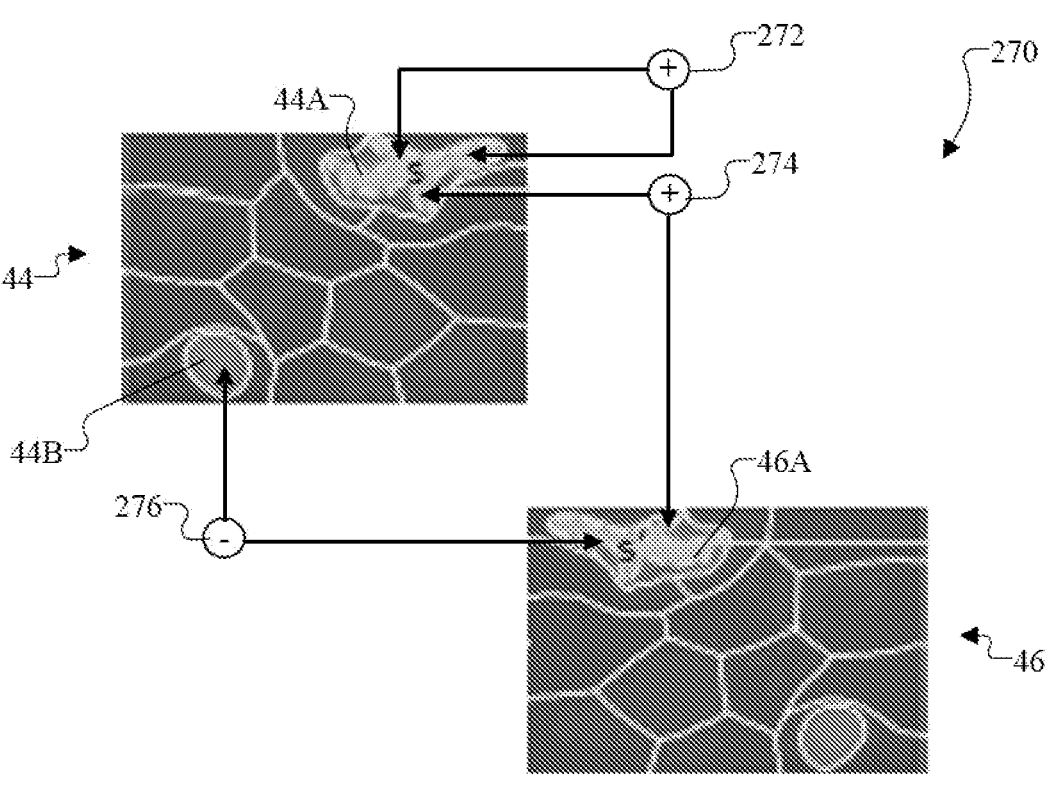
FIG. 2B is a diagram of a non-limiting example that illustrates aspects of generating first loss data for the framework of FIG. 2A according to an example embodiment of this disclosure.

FIG. 2B illustrates a non-limiting example of a positive set 272 that includes one part of a jet segment embedding 44A, as shown in image 44, and another part of the same jet segment embedding 44A, as shown in image 44. In addition, FIG. 2B illustrates an example of another positive set 274 that includes the jet segment embedding 44A, as shown in image 44, and another jet segment embedding 46A, as shown in image 46. FIG. 2B also illustrates an example of a negative set 276 that includes an unknown segment embedding 44B, as shown in image 44, and the jet segment embedding 46A, as shown in image 46.

The pixel embedding $z_p$ is then attracted to the segments in positive set $S^+$ and repelled from the segments in negative set $S^-$ via contrastive loss, as expressed in equation 1. More specifically, in equation 1, $\kappa$ is the concentration constant and sim $(z_p, c_s)$ is the cosine similarity between the pixel embedding $z_p$ and the segment embedding $v_s$. In this regard, the framework 200 computes similarity data between pixel embedding $z_p$ and segment embedding $v_s$, as expressed in equation 1, to generate contrastive loss data.

$$\mathcal{L}_t(p) = -\log \frac{\sum_{s \in S+} \exp(sim(z_p, v_s)\kappa)}{\sum_{s \in S+US-} \exp(sim(z_p, v_s)\kappa)} \quad [1]$$

Also, as shown in FIG. 2A, the framework 200 obtains the pixel embeddings of the source image 12 from the pretrained vision-language model 210 via the modified image encoder 210A (e.g., MaskCLIP). The modified image encoder 210A includes a modification of the attention-based pooling layer of the image encoder of the pretrained vision-language model 210. More specifically, this modification includes (i) removal of the query and key projection layers and (ii) a reformulation of the value projection layer and the last linear layer as two consecutive fully connected layers. As an example, for instance, the framework 200 uses clip-i(·) as the modified image encoder 210A and clip-t(·) as text encoder 210B. Referring back to FIG. 2A, the pixel embeddings, which are generated by modified image encoder 210A and which are shown in image 20, are more coarse and more noisy than the pixel embeddings, which are generated by the encoder 220A and which are shown in image 22 and image 24, respectively.

The framework 200 then obtains the pixel embeddings, which were generated by the pretrained vision-language model 210, for different augmented views of the source image 12. Specifically, the framework 200 generates, via the pretrained vision-language model 210, the pixel embeddings, as shown in image 20, as output upon receiving the source image 12 as input. In FIG. 2A, the image 20 is provided as a visualization of the pixel embeddings, which are generated by the pretrained vision-language model 210 (e.g., modified image encoder 210A such as MaskCLIP).

The framework 200 is configured to perform data augmentation afterwards to make sure that the pixel embeddings of the pretrained vision-language model 210 correspond to the pixel embeddings of the machine learning model 220 among different augmented views. The framework 200 also minimizes the distance of embeddings between segments (instead of pixels) from the self-supervised and vision-language embedding spaces. As shown in FIG. 2A, these actions are performed on segment embeddings because the pixel embeddings are noisy, which are mitigated by aggregating over segments. Hence, the framework 200 uses the pixel embeddings generated by the machine learning model 220 to derive segments (or clusters) of visually coherent regions and generate segment contour data that define these segments (or clusters).

The framework 200 includes a segment applicator 250. The segment applicator 250 is configured to (i) receive the data augmentation data that created image 14 from the source image 12 and the segment contour data that defines the clusters of image 32 and (ii) generate segment embeddings of image 40 by applying the data augmentation data and the segment contour data to the pixel embeddings of image 20. In addition, the segment applicator 250 is configured to (i) receive the data augmentation data that created image 16 from the source image 12 and the segment contour data that defines the clusters of image 34 and (ii) generate segment embeddings of image 42 by applying the data augmentation data and the segment contour data to the pixel embeddings of image 20.

For each segment s, the framework 200 defines the embedding consistent loss via equation 2, where $v_s$ and $i_s$ are the segment embeddings derived from the embedding function of the machine learning model 220 and the embedding function of the pretrained vision-language model 210 (e.g., CLIP), respectively. Here, the average of the pretrained vision-language model's pixel embeddings from segment s, namely, is $i_s = \Sigma_{p \in s}$ clip–i(s)/|s|. The framework 200 generates embedding consistent loss data via equation 2, which involves computing similarity data via a cosine similarity between the segment embedding, $v_s$, of the machine learning model 220 and the segment embedding, $i_s$, of the pretrained vision-language model 210.

$$\mathcal{L}_e(s) = 1 - sim(v_s, i_s) \quad [2]$$

Figure 2C:
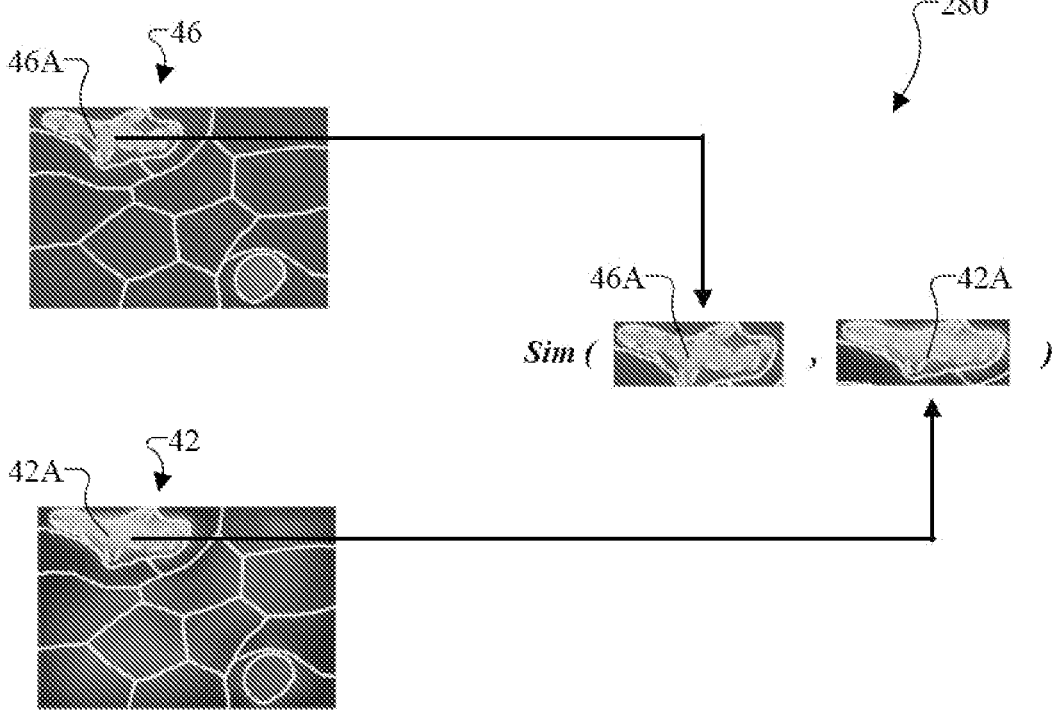
FIG. 2C is a diagram of a non-limiting example that illustrates aspects of generating second loss data for the framework of FIG. 2A according to an example embodiment of this disclosure.

FIG. 2C illustrates aspects of computing the embedding consistent loss. In this non-limiting example, the framework 200 generates embedding consistent loss data by comparing a similarity between a segment embedding 46A, which is derived from the machine learning model 220, and a corresponding segment embedding 42A, which is derived from the pretrained vision-language model 210. As shown in FIG. 2C, the segment embedding 46A from the machine learning model 220 is of higher quality than the segment embedding 42A of the pretrained vision-language model 210. The segment embedding 46A, which is shown in image 46, and the segment embedding 42A, which is shown in image 42, both correspond to a visually coherent region or a segment relating to a known class of jet.

In addition to embedding consistency, the framework 200 provides semantic consistency by forcing the machine learning model 220 to make the same predictions of semantic classes as the pretrained vision-language model 210. The rationale is that the framework 200 is configured to generate better pixel embeddings if distinctive clusters are formed to correspond to different semantic classes, as the goal of semantic segmentation is to perform pixel-wise classification. Semantic consistency is achieved via pseudo-labeling. Again, the framework 200 forces the semantic consistency directly at the segment level (not directly at the pixel level) to reduce the noise in pseudo-labels $y_s$.

Specifically, for each segment s, the framework 200 uses the pretrained vision-language model 210 to generate its pseudo-label $y_s$ over a set of target classes, which include both known classes and unknown classes. The target classes are also discussed later in this disclosure. The pseudo-label $y_s$ is generated based on the greatest similarity or the highest similarity between the segment embedding $i_s$ with a set of class prototypes 260, $$C = [c_l]_0^{L-1}$$

of the target classes in the pixel embedding space of the pretrained vision-language model 210 such that $y_s = \text{argmax}_{l \in L} (\text{sim } (i_s, c_l))$.

Then, as expressed in equation 3, the framework 200 defines the semantic consistent loss as the cross entropy between the prediction $\varphi$ ($v_s$) by the machine learning model 220 over the target classes and the pseudo-label $y_s$. In equation 3, $\varphi$ ($v_s$)=softmax (sim($v_s$, C)). The framework 200 generates semantic consistent loss data via equation 3.

$$\mathcal{L}_s(s) = H(y_s, \varphi(v_s)) \tag{3}$$

Figure 2D:
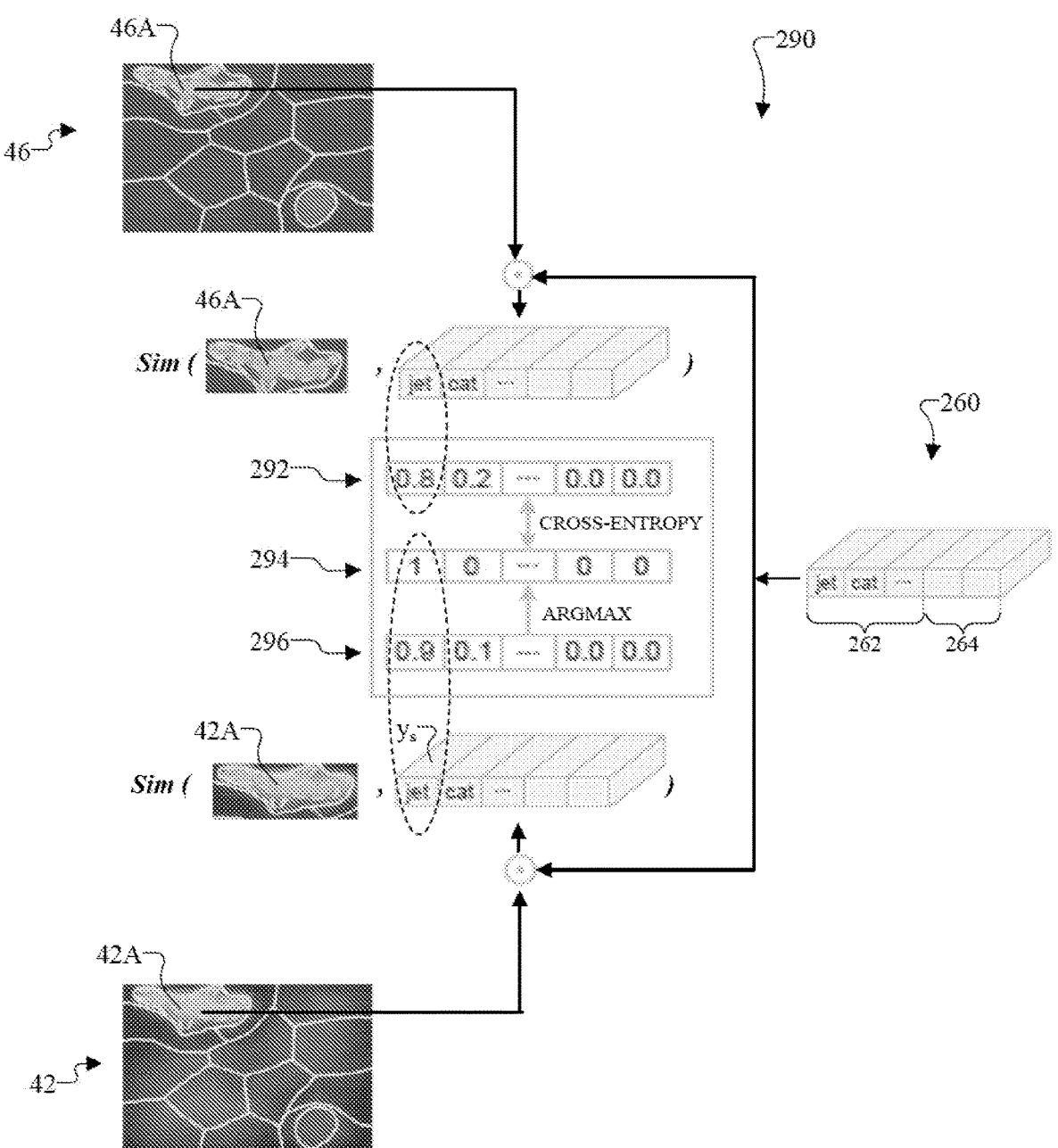
FIG. 2D is a diagram of a non-limiting example that illustrates aspects of generating third loss data for the framework of FIG. 2A according to an example embodiment of this disclosure.

FIG. 2D illustrates aspects of computing the semantic consistent loss using target class prototypes 260. More specifically, in the non-limiting example shown in FIG. 2D, the framework 200 compares a similarity between a segment embedding 42A, which is derived from the pretrained vision-language model 210, and each of the target class prototypes 260, which includes known class prototypes 262 and unknown class prototypes 264. The framework 200 generates similarity data 296 via a cosine similarity function (denoted by "Sim (first feature, second feature)"). The similarity data 296 is indicative of a measure of how similar (or dissimilar) the segment embedding 42A is to each of the target class prototypes 260. As aforementioned, there is a greater similarity between two features when the similarity value is closer to or equal to 1. Also, there is greater dissimilarity between two features when the similarity is closer to or equal to 0. For instance, in this non-limiting example, the framework 200 generates similarity data 296 indicating that the segment embedding 42A is more similar to the known class prototype of jet compared to the other known class prototypes and unknown class prototypes. The framework 200 also generates additional data 294 to locate the class with the largest predicted probability via an argmax function. In this case, the framework 200 determines that the class prototype of jet exhibits the largest predicted probability for the segment embedding 42A compared to the other class prototypes (e.g., class prototype of cat, a class prototype of a first unknown class, a class prototype of a second unknown class, etc.). The framework 200 therefore uses the known class prototype of jet as the pseudo-label $y_s$ over the set of target class prototypes 260.

In addition, the framework 200 compares a similarity between a segment embedding 46A, which is derived from the machine learning model 220, and each of the target class prototypes 260, which includes known class prototypes 262 and unknown class prototypes 264. The framework 200 generates similarity data 292 via a cosine similarity function (denoted by "Sim (first feature, second feature)"). The similarity data 292 (or similarity measurement) is indicative of a measure of how similar (or dissimilar) the segment embedding 46A is to each of the target class prototypes 260. There is a greater similarity between two features when the similarity value is closer to or equal to 1. Also, there is greater dissimilarity between two features when the similarity is closer to or equal to 0. For instance, in this non-limiting example, the framework 200 generates similarity data indicating that the segment embedding 46A is more similar to the known class prototype of jet compared to the other known class prototypes and unknown class prototypes. The framework 200 provides the known class prototype of jet as the class prediction over the target classes. The framework then uses equation 3 and computes the semantic consistent loss as the cross entropy between the prediction class prediction of the machine learning model 220 and the pseudo-label $y_s$.

FIG. 3 is a flow diagram 300, which illustrates aspects of target class prototypes 260. As shown in FIG. 3, the target class prototypes 260 include both known class prototypes 262 and unknown class prototypes 264 as represented by $C=\{C_k, C_u\}$, where C represents a set of the target class prototypes 260, $C_k$ represents a set of the known class prototypes 262, and $C_u$ represents a set of the unknown class prototypes 264. For a set of known classes 302 (e.g., jet, cat, etc.), where K={0, . . . , k−1}, the framework 200 first generates, via a text encoder 210B of the pretrained vision-language model 210, a set of text embeddings 306, $T=\{t_k\}=\{clip\text{-}t(k)\}$, by using a set of prompt templates 304. Specifically, the text encoder 210B receives the set of known classes as text input via the prompt templates 304. Then, the framework 200 calculates, via softmax, the normalized similarity between text embeddings 306, T, and all segment embeddings 308, $I=\{i_s\}$, of the pretrained vision-language model 210 based upon the training images 10, and average the top-m similar segment embeddings 308 of the pretrained vision-language model 210 as the class prototype for that class, $C_k=\{c_k\}=avg_m(top\text{-}m_s(softmax_k(sim(I,T))))$.

For each unknown class, Cu, the framework 200 randomly selects a segment embedding 308 (e.g., $i_r$) of an image segment as the initial prototype, $c_u=i_r$. The random selection may be made with respect to a subset taken from the set of all segment embeddings 308. The subset comprises segment embeddings that are not associated with the set of known classes 302. For example, $i_0$ is associated with the known class of jet, whereas $i_3$ is not associated with a known class from the set of known classes 302. In other words, the subset comprises a number of segment embeddings 308 that correspond to unknown classes (e.g., currently unnamed classes associated with placeholder classes). For example, in FIG. 3, the framework 200 randomly selects an embedding segment $i_3$ from among this subset such that $i_r=i_3$. Instead of using text embeddings 306 of only a set of predefined/known classes 302, the framework 200 includes two sets of target classes with both known class prototypes 262 and unknown class prototypes 264, which enables language-driven class-free semantic segmentation.

The design of target classes and associated class prototypes, $$C = [c_l]_0^{L-1},$$

is crucial to achieve the semantic consistency. Here, a class prototype, $c_l$, is an embedding vector that can represent a class in an embedding space (e.g., vision-language embedding space). For example, the class prototype can be the mean vector of embeddings of all segments of a class "car" (or the mean vector of all segment embeddings of a class "car"). Assuming that the target classes are already predefined is not feasible in real-world use cases without any human annotations. Thus, such methods with these assumptions cannot handle unknown classes hidden in the data. To address this issue, the framework 200 includes two sets of class prototypes 260. The first set of class prototypes 260 include known class prototypes 262, $C_k=\{c_0, \ldots, c_{k-1}\}$, which are associated with the set of known classes 302 The set of known classes 302 are predetermined and given to the framework 200 during training. The second set of class prototypes include unknown class prototypes 264, $C_u=\{c_k, \ldots, c_{k+u}\}$, which are associated with unknown classes. The unknown class prototypes 264 are associated with unknown classes (which may sometimes be referred to as "placeholder classes"). The unknown classes serve as placeholders until that input data is obtained at a later time (e.g., during inference) since that input data is not provided as the set of known classes 302 during training. The known class prototypes 262 are predefined by leveraging the pretrained vision-language model 210. Meanwhile, the unknown class prototypes 264 are learned from the segment embeddings during training. Thus, the framework 200 has target class prototypes 260, which may be represented as $$C = [c_l]_0^{L-1} = \{c_0, \ldots, c_{k-1}, c_k, \ldots, c_{k+u}\},$$

where L=k+u.

Figure 4A:
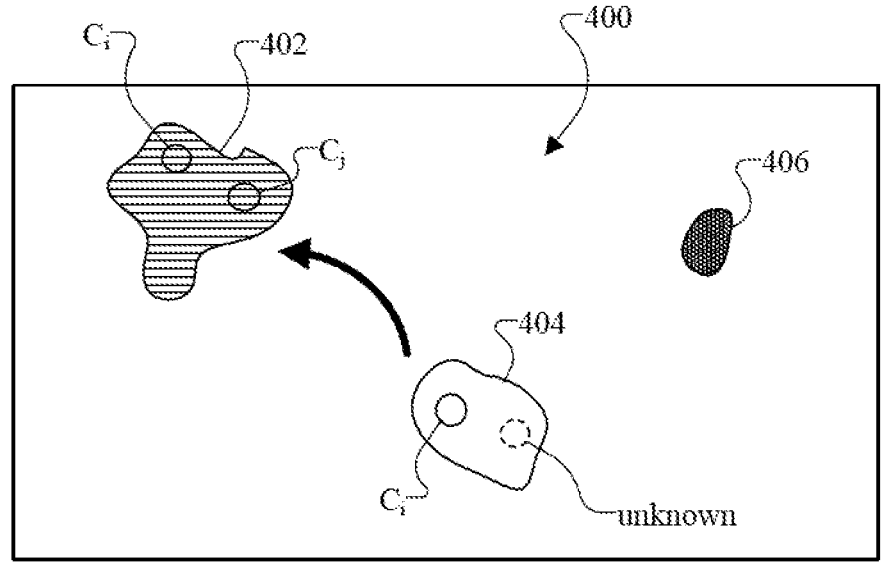
FIG. 4A is a diagram of a non-limiting example of an embedding space that includes semantics in which a set of pixel embeddings from the pretrained vision-language model is not aligned with a set of pixel embeddings from the machine learning model according to an example embodiment of this disclosure.
Figure 4B:
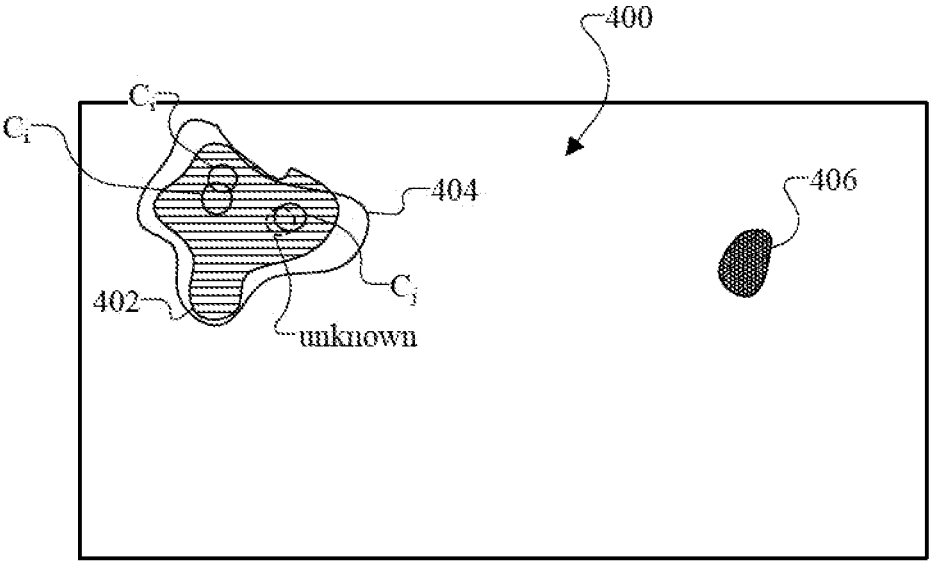
FIG. 4B is a diagram a non-limiting example of an embedding space that includes semantics in which a set of pixel embeddings from the pretrained vision-language model is aligned with a set of pixel embeddings from the machine learning model according to an example embodiment of this disclosure.

For known classes, a natural choice is to use the text embeddings (e.g., contour 406) generated by the pretrained vision-language model 210 as their class prototype embeddings. However, even though the text embeddings (e.g., contour 406) are trained to align with image/pixel embeddings (e.g., contour 402), there is still a huge gap between the text embeddings (e.g., contour 406) and the image/pixel embeddings (e.g., contour 402) in the joint vision-language embedding space 400, as shown in FIG. 4A and FIG. 4B. Therefore, there are some challenges in learning meaningful unknown classes from image features when using text embeddings (e.g., contour 402) as class prototypes. Hence, the framework 200 leverages pixel embeddings from the pretrained vision-language model 210 to represent each known class.

To this end, for a set of known classes 302 (e.g., jet, cat, etc.), K={0, . . . , k−1}, the framework 200 first obtains a set of text embeddings 306. T={$t_k$}={clip–t(k)}, via a set of prompt templates 304. For example, the set of known classes 302 may be input to the pretrained vision-language model 210 (e.g., CLIP) by a user (e.g. software developer, etc.) via the prompt templates 304 during training. The framework 200 also obtains a set of segment embeddings, I={$i_s$} generated by the pretrained vision-language model 210 for all training images 10 by a) feeding training images 10 into the modified image encoder 210A to generate pixel embeddings; b) clustering the pixel embeddings as segments, Ŝ; and c) averaging the pixel embeddings in each segment, ŝ. Accordingly, the framework 200 is configured to generate a segment embedding for each segment as represented by $i_s = \Sigma_{p \in s}$clip–i(s)/|ŝ|.

The framework 200 (i) calculates the similarity between text embeddings 306 of known classes generated by the pretrained vision-language model 210 and all segment embeddings 308 generated by the pretrained vision-language model 210 and (ii) normalizes these similarities over all known classes by softmax. Finally, the framework 200 averages the top-m similar segment embeddings to generate a known class prototype 262 for each known class, $C_k$={$c_k$}=avg$_m$(top–m$_s$(softmax$_k$(sim(I,T) Also, in FIG. 3, the unknown class prototypes 264 (e.g., embedding vectors) of the unknown classes, $C_u$, are randomly initialized by sampling the segment embeddings 308, which are generated by the pretrained vision-language model 210. For example, the framework 200 performs random sampling such that $C_u$=random(clip–i(Ŝ),u) with a size of the unknown class of u.

During training, the segment embedding $c_u$ of each unknown class prototype 264 is updated by minimizing its distance to all segments that are classified as this unknown class (similar to updating the centroids in k-means clustering), as expressed in equation 4. In this example, the framework 200 uses the cosine similarity function to generate similarity data (or distance data) between the segment embedding $c_u$ and all segment embeddings (or all segments of pixel embeddings) that are classified as this unknown class. More specifically, in equation 4, $S_u$ represents the segments (or segment embeddings) classified as the unknown classes. In this regard, the framework 200 is configured to generate prototype loss data via equation 4 and learn the pixel representations of unknown classes. During training, the framework 200 updates the embeddings for the unknown classes (or updates an unknown class prototype 264) via $\mathcal{L}_u$.

$$\mathcal{L}_u = \sum\nolimits_{s \in S_u} \left( (1 - sim(c_u, \text{clip} - i(s)))/|S_u| \right) \qquad [4]$$

In summary, the framework 200 trains the pixel embedding function by a combined loss $\mathcal{L}$, which is a sum that combines the pixel-segment contrastive loss data (e.g., $\mathcal{L}_t$), the embedding consistent loss data (e.g., $\mathcal{L}_e$), and semantic consistent loss data (e.g., $\mathcal{L}_s$), as indicated in equation 5. In this regard, the framework 200 generates combined loss data via computing the combined loss $\mathcal{L}$ expressed in equation 5. In addition, the framework 200 is configured to update parameters of the machine learning model 220 based on this combined loss data.

$$\mathcal{L} = \mathcal{L}_t + \mathcal{L}_e + \mathcal{L}_s \qquad [5]$$

For inference, the system 100 uses the trained framework 200 (e.g., the trained machine learning model 220) to generate pixel embeddings for each input image (e.g., digital image) and use the pixel embeddings for different downstream tasks, including language-driven and unsupervised semantic segmentation. For language-driven semantic segmentation, the framework 200 first obtains the text embeddings of arbitrary inference classes by feeding the prompt-engineered texts into prompt templates 304 for the text encoder 210B of the pretrained vision-language model 210. Then, the framework 200 assigns each pixel or segment with the class name (or the class label) whose text embedding is the closest to the pixel embedding or segment embedding generated by the framework 200 (e.g., the trained machine learning model 220). For unsupervised semantic segmentation, the framework 200 uses k nearest neighbor search or linear classifier to perform semantic segmentation.

FIG. 4A and FIG. 4B illustrate a vision-language embedding space 400, which includes two different sets of pixel embeddings together with their semantics. More specifically, FIG. 4A and FIG. 4B illustrate a set of pixel embeddings of the pretrained vision-language model 210 that is outlined by contour 402 and a set of pixel embeddings of the machine learning model 220 that is outlined by contour 404. Also, the contour 402 includes, for example, $C_i$ to represent a class prototype and $C_j$ to represent another class prototype. For instance, as a non-limiting example, $C_i$ may represent a class prototype associated with a jet class and $C_j$ may represent a class prototype associated with a moon class, as discussed in other non-limiting examples of this disclosure. Meanwhile, the contour 404 also includes, for example, $C_i$ to represent a class prototype and "unknown" to represent another class prototype. In this regard, $C_i$ of contour 402, which is generated from pixel embeddings of the pretrained vision-language model 210, corresponds to $C_i$ of contour

404, which is generated form pixel embeddings of the machine learning model 220. Also, $C_j$ of contour 402, which is generated from pixel embeddings of the pretrained vision-language model 210, corresponds to the "unknown" contour 404, which is generated from pixel embeddings of the machine learning model 220.

FIG. 4A illustrates a non-limiting example in which a contour 402 of a set of pixel embeddings of the pretrained vision-language model 210 is not aligned with a contour 404 of a set of pixel embeddings of the machine learning model 220. As shown in FIG. 4A, when the contour 402 is not aligned with the contour 404, then the class prototype $C_i$ of the pretrained vision-language model 210 is not aligned with the class prototype $C_i$ of the machine learning model 220 in the vision-language embedding space 400. Also, when the contour 402 is not aligned with the contour 404, then the class prototype $C_j$ of the pretrained vision-language model 210 is not aligned with the corresponding "unknown" class prototype of the machine learning model 220 in the vision-language embedding space 400. In addition, FIG. 4A and FIG. 4B illustrate a contour 406 of the text embeddings of the pretrained vision-language model 210 as being separate from the contour 402 in the vision-language embedding space 400. FIG. 4A and FIG. 4B also illustrate the contour 406 of the text embeddings of the pretrained vision-language model 210 as being separate from the contour 404 in the vision-language embedding space 400.

As mentioned earlier in this disclosure, to enable language-driven semantic segmentation and improve the quality of pixel embeddings, the framework 200 uses a pretrained vision-language model 210 (e.g., CLIP) to guide the training of the pixel embedding function of the machine learning model 220. The framework 200 aligns an output space of pixel embedding function of the machine learning model 220 to be consistent with a feature space of the pretrained vision-language model 210. The framework 200 is configured to guide and/or align the pixel embeddings generated from the self-supervised method of the machine learning model 220 with the pixel embeddings generated from the pretrained vision-language model 210. The framework 200 performs this alignment by minimizing the distance between the pixel embeddings of the machine learning model 220 and the pixel embeddings of the pretrained vision-language model 210 in the vision-language embedding space 400.

FIG. 4B illustrates a non-limiting example in which the contour 402 of the pixel embeddings of the pretrained vision-language model 210 is aligned or at least partly aligned (or at least partly overlapping) with the contour 404 of the pixel embeddings of the machine learning model 220 in the vision-language embedding space 400 via the framework 200. In this non-limiting example, the contour 404 of FIG. 4B is larger than the contour 404 of FIG. 4A at least due to the training provided by the framework 200. In addition, FIG. 4B illustrates the class prototype $C_i$ of the machine learning model 220 as being aligned or at least partly aligned (or at least partly overlapping) with the class prototype $C_i$ of the pretrained vision-language model 210 in the vision-language embedding space 400. Also, the "unknown" class prototype of the machine learning model 220 is aligned or at least partly aligned (or at least partly overlapping) with the class prototype $C_j$ of the pretrained vision-language model 210 in the vision-language embedding space 400. As shown and discussed above with respect to FIG. 4A and FIG. 4B, the framework 200 is advantageous in at least partly aligning (or partly overlapping) the pixel embeddings and their semantics (e.g., contour 406 of text embeddings) in the vision-language embedding space 400 such the embedding quality and the learning of representations for unknown classes are improved.

FIG. 5 is a flow diagram 500 of a non-limiting example of the framework 200 during inference. More specifically, during inference, the framework 200 is configured to receive a digital image 502 as input data. In this non-limiting example, the digital image 502 displays a jet 502A a moon 502B, and a sky 502C. Upon receiving this digital image 502, the machine learning model 220 is configured to generate pixel embeddings as output upon receiving the digital image 502 as input. The framework 200 is then configured to generate a set of segment embeddings, as shown in image 504, using the pixel embeddings of the machine learning model 220. The set of segment embeddings are generated based on clusters of pixel embeddings that share similar semantic meanings or belong to similar/same visually coherent regions. For example, the set of segment embeddings include a segment embedding 504A for the jet, a segment embedding 504B for the moon, and a number of segment embeddings 504C for the sky.

In addition, a set of classes 506 (e.g., jet, cat, moon, etc.) may be input by a user (e.g., a software developer) via a prompt template 304. In this non-limiting example, the prompt template 304 is "A photo of a {class name}," where "{class name}" represents the user input (e.g., class name such as jet). In this non-limiting example, for instance, the set of classes 506 include a jet class 506A, a moon class 506B, and a number of other classes (e.g. cat class, etc.). Also, as shown in FIG. 5, the modified image encoder 210A (e.g. Mask CLIP) is configured to generate a set of text embeddings 508 as output upon receiving the set of classes 506 as input. For example, the modified image encoder 210A is configured to generate a text embedding 508A for the jet class 506A, a text embedding 508B for the moon class 506B, and a number of other text embeddings for a number of other classes.

The framework 200 then determines a similarity of each segment embedding in relation to each text embedding. As a non-limiting example, for instance, the framework 200 computes a cosine similarity between the segment embedding 504A (corresponding to the jet segment) and the text embedding 508B (corresponding to the moon class). As another non-limiting example, for instance, the framework 200 computes a cosine similarity between the segment embedding 504B (corresponding to the moon segment) and the text embedding 508B (corresponding to the moon class). As shown in FIG. 5, in this case, the framework 200 determines that the segment embedding 504A (corresponding to the jet segment) has a lower probability (e.g., similarity data less than 0.5) of correlating with the text embedding 508B (corresponding to the moon class) while also determining that the segment embedding 504B has a higher probability (e.g., similarity data greater than 0.5) of correlating with the text embedding 508B (corresponding to the moon class).

After performing the cosine similarity computations, the framework 200 generates semantic segmentation data, which includes at least the assignment of the set of classes 506 to the set of image segments (e.g., mask segments), as shown in image 510. For example, the framework 200 assigns the jet class 506A to the image segment 510A (and pixels comprising that image segment 510A) upon determining that the similarity data is within a predetermined threshold range. The framework 200 assigns the moon class 506B to the image segment 510B (and pixels comprising the image segment 510B) upon determining that the similarity data is within a predetermined threshold range. In addition, the framework 200 does not assign a class name from the set of classes 506 to the image segment 510C as the corresponding segment embeddings 504C do not exhibit sufficient probability/correlation with the set of text embeddings 508 with respect to the computed similarity data in relation to the predetermined threshold range. In such cases, the framework 200 may assign a default label (e.g., background label) to these image segments 510C.

In the event that the class name of "sky" is input via a prompt template 304 during a later inference time, then the framework 200 is configured to assign the sky class to each of the number of image segments 510C that correspond to the sky at least since the framework 200 learned these segments as an unknown class prototype during training. The framework 200 is able to perform this action similarly how the framework 200 is able to assign the moon class 506B to the image segment 510B during inference even though the moon class name was not provided as input to the text encoder 210B during training (FIG. 3). In this regard, the framework 200 is advantageous in being configured to generate semantic segmentation data (e.g. a semantic label or a class label) for any segment of a digital image during inference time from either (i) known classes, which were provided to the framework 200 (e.g., text encoder 210B) during training, or (ii) unknown classes. The unknown classes may be considered as placeholders for new input data, which may be received and transformed by the framework 200. For example, a new class name, such as "sky," may be appended to the set of classes 506 during inference. This new class name of "sky" is considered as an unknown class during training and associated with a particular unknown class prototype during training. However, the framework 200 may receive this new class name (e.g., sky) from a user may during inference time and the framework 200 is enabled to generate semantic segmentation data (e.g., semantic labels or class labels) for all image segments 510C of the digital image 502 that correspond to this new input data (e.g., class name of sky). In this regard, during inference time, the framework 200 is configured to (i) enable a user to input an arbitrary class name, which is not known during training, and (ii) encode this at least one arbitrary class name into text embedding to match the most similar segment embedding.

Figure 6:
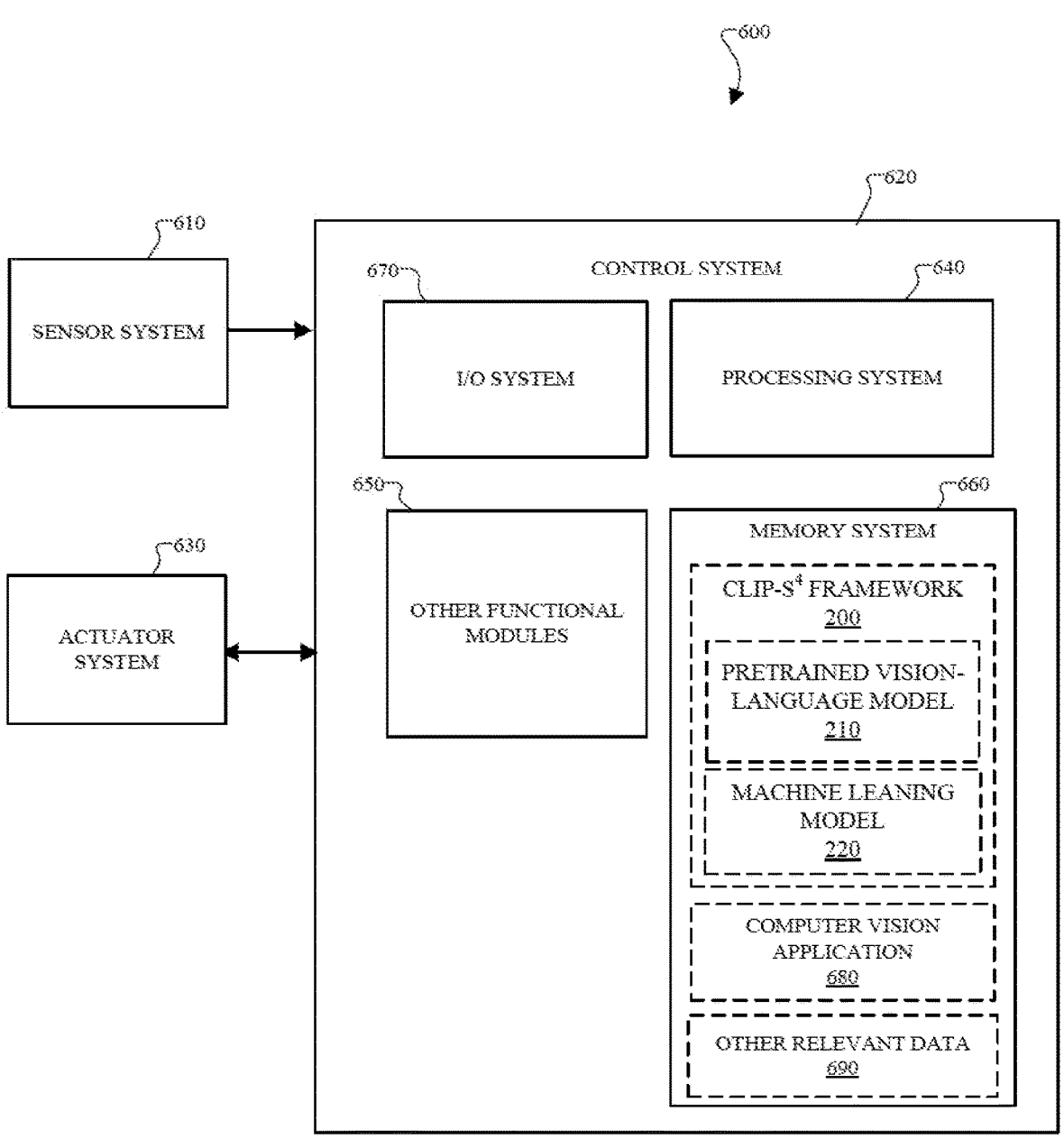
FIG. 6 is a diagram of an example of a control system that employs the framework of FIG. 2A according to an example embodiment of this disclosure.

FIG. 6 is a diagram of a system 600, which includes the framework 200 configured for language-guided self-supervised semantic segmentation. In this example, the system 600 is includes at least a sensor system 610, a control system 620, and an actuator system 630. The system 600 is configured such that the control system 620 controls the actuator system 630 based on sensor data from the sensor system 610. More specifically, the sensor system 610 includes one or more sensors and/or corresponding devices to generate sensor data. For example, the sensor system 610 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any number and combination thereof. Upon obtaining detections from the environment, the sensor system 610 is operable to communicate with the control system 620 via an input/output (I/O) system 670 and/or other functional modules 650, which includes communication technology.

The control system 620 is configured to obtain the sensor data directly or indirectly from one or more sensors of the sensor system 610. In this regard, the sensor data may include sensor data from a single sensor or sensor-fusion data from a plurality of sensors. Upon receiving input, which includes at least sensor data, the control system 620 is operable to process the sensor data via the processing system 640. In this regard, the processing system 640 includes at least one processor. For example, the processing system 640 includes an electronic processor, a CPU, a GPU, a microprocessor, an FPGA, an ASIC, processing circuits, any suitable processing technology, or any combination thereof. Upon processing at least this sensor data, the processing system 640 is configured to extract, generate, and/or obtain proper input data (e.g., digital image data) for the framework 200. In addition, the processing system 640 is operable to generate output data (e.g., semantic segmentation data with respect to objects displayed in digital images) via the framework 200 based on communications with the memory system 660. In addition, the processing system 640 is operable to provide actuator control data to the actuator system 630 based on the output data, semantic segmentation data, and/or object recognition data.

The memory system 660 is a computer or electronic storage system, which is configured to store and provide access to various data to enable at least the operations and functionality, as disclosed herein. The memory system 660 comprises a single device or a plurality of devices. The memory system 660 includes electrical, electronic, magnetic, optical, semiconductor, electromagnetic, any suitable memory technology, or any combination thereof. For instance, the memory system 660 may include RAM, ROM, flash memory, a disk drive, a memory card, an optical storage device, a magnetic storage device, a memory module, any suitable type of memory device, or any number and combination thereof. In an example embodiment, with respect to the control system 620 and/or processing system 640, the memory system 660 is local, remote, or a combination thereof (e.g., partly local and partly remote). For example, the memory system 660 may include at least a cloud-based storage system (e.g. cloud-based database system), which is remote from the processing system 640 and/or other components of the control system 620.

The memory system 660 includes at least the framework 200, which is executed via the processing system 640. The framework 200 is configured to receive or obtain input data, which includes at least one digital image. In addition, the framework 200, via the processing system 640, is configured to generate output data (e.g., semantic segmentation data) based on the input data (e.g., digital image). As discussed earlier, the framework 200 includes at least the pretrained vision-language model 210 and the machine learning model 220. In this example, the machine learning model 220 has been trained as discussed above using the combined loss data $\mathcal{L}$ and the prototype loss data $\mathcal{L}_u$. In addition, the memory system 660 includes a computer vision application 680, which includes computer readable data including instructions that uses the output data of the framework 200 to provide a number of computer vision services for the control system 620. The computer vision application 680 works with the framework 200 to provide a number of computer vision services (e.g., object recognition) to the control system 620 so that the control system 620 may control the actuator system 630 according to the computer vision services. The memory system 660 is also configured to store other relevant data 690, which relates to the operation of the system 600 in relation to one or more components (e.g., sensor system 610, the actuator system 630, etc.).

Furthermore, as shown in FIG. 6, the system 600 includes other components that contribute to operation of the control system 620 in relation to the sensor system 610 and the actuator system 630. Also, as shown in FIG. 6, the control system 620 includes the I/O system 670, which includes one or more interfaces for one or more I/O devices that relate to the system 600. For example, the I/O system 670 provides at least one interface to the sensor system 610 and at least one interface to the actuator system 630. Also, the control system 620 is configured to provide other functional modules 650, such as any appropriate hardware technology, software technology, or any combination thereof that assist with and/or contribute to the functioning of the system 600. For example, the other functional modules 650 include an operating system and communication technology that enables components of the system 600 to communicate with each other as described herein. With at least the configuration discussed in the example of FIG. 6, the system 600 is applicable in various technologies.

Figure 7:
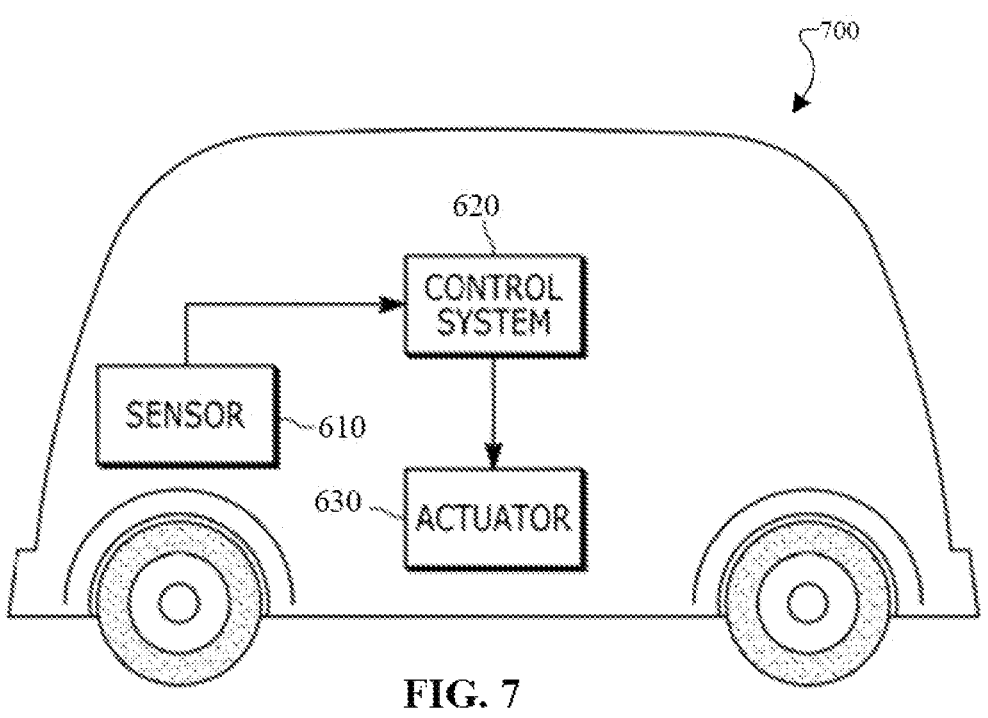
FIG. 7 is a diagram of the control system of FIG. 6 with respect to mobile machine technology according to an example embodiment of this disclosure.

FIG. 7 is a diagram of the system 600 with respect to mobile machine technology 700 according to an example embodiment. As a non-limiting example, the mobile machine technology 700 includes at least a partially autonomous vehicle or robot. In FIG. 7, the mobile machine technology 700 is at least a partially autonomous vehicle, which includes a sensor system 610. The sensor system 610 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. The sensor system 610 is configured to provide sensor data to the control system 620.

The control system 620 is configured to obtain or generate image data, which is based on sensor data or sensor-fusion data from the sensor system 610. In addition, the control system 620 is configured to pre-process the sensor data to provide input data of a suitable form (e.g., digital image data) to the framework 200. The framework 200 is advantageously configured to provide semantic segmentation data so that objects displayed in the sensor data may be detected and recognized.

In addition, the control system 620 is configured to generate actuator control data, which is based at least on output data (e.g. semantic segmentation data, object identification data, etc.) of the framework 200 in accordance with the computer vision application 680. In this regard, the control system 620 is configured to generate actuator control data that allows for safer and more accurate control of the actuator system 630 of the vehicle by the improved semantic segmentation provided by the framework 200. The actuator system 630 may include a braking system, a propulsion system, an engine, a drivetrain, a steering system, or any number and combination of actuators of the vehicle. The actuator system 630 is configured to control the vehicle so that the vehicle follows rules of the roads and avoids collisions based at least on the output data (e.g. semantic segmentation data) that is generated by the framework 200 in response to receiving one or more digital images based on the sensor data.

Figure 8:
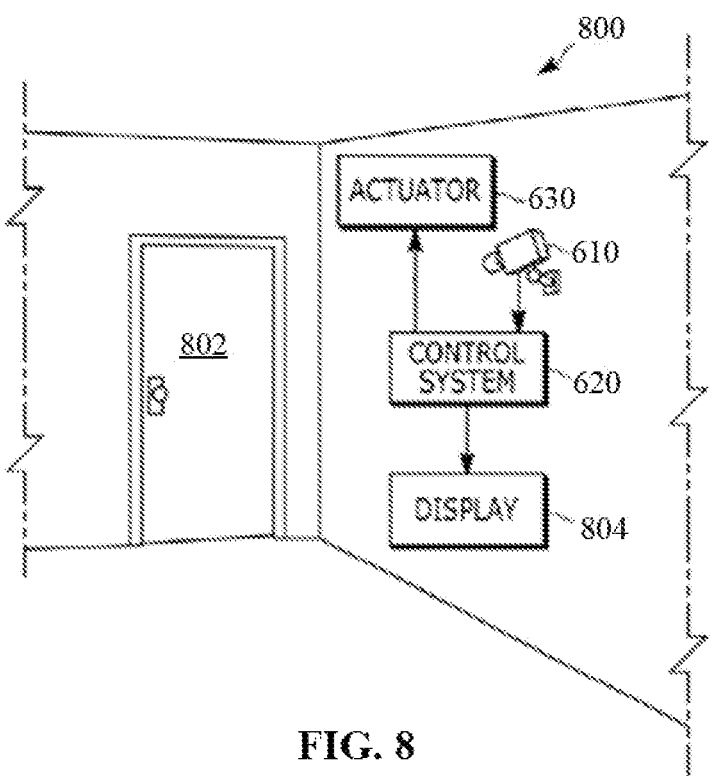
FIG. 8 is a diagram of the control system of FIG. 6 with respect to security technology according to an example embodiment of this disclosure.

FIG. 8 is a diagram of the system 600 with respect to security technology 800 according to an example embodiment. As a non-limiting example, the security technology 800 includes at least a monitoring system, a control access system, a surveillance system, or any suitable type of security apparatus. For instance, as one example, FIG. 8 relates to security technology 800, which is configured to physically control a locked state and an unlocked state of a lock of the door 802 and display an enhanced image/video on the display technology 804. The security technology 800 may also trigger an alarm and/or provide electronic notifications to other communication devices/technologies. In this example, the sensor system 610 includes at least an image sensor that is configured to provide image/video data. The sensor system 610 may also include other sensors, such as a motion sensor, infrared sensor, etc.

The control system 620 is configured to obtain the image/video data from the sensor system 610. The control system 620 is also configured generate semantic segmentation data via the framework 200 based on the image/video data obtained from the sensor system 610. In addition, the control system 620 is configured to generate actuator control data that allows for safer and more accurate control of the actuator system 630 by using output data (e.g. semantic segmentation data), which is generated by the framework 200. The control system 620 is configured to display the output data of the framework 200, or any data relating to the computer vision application 680, or any number and combination thereof on the display technology 804.

Figure 9:
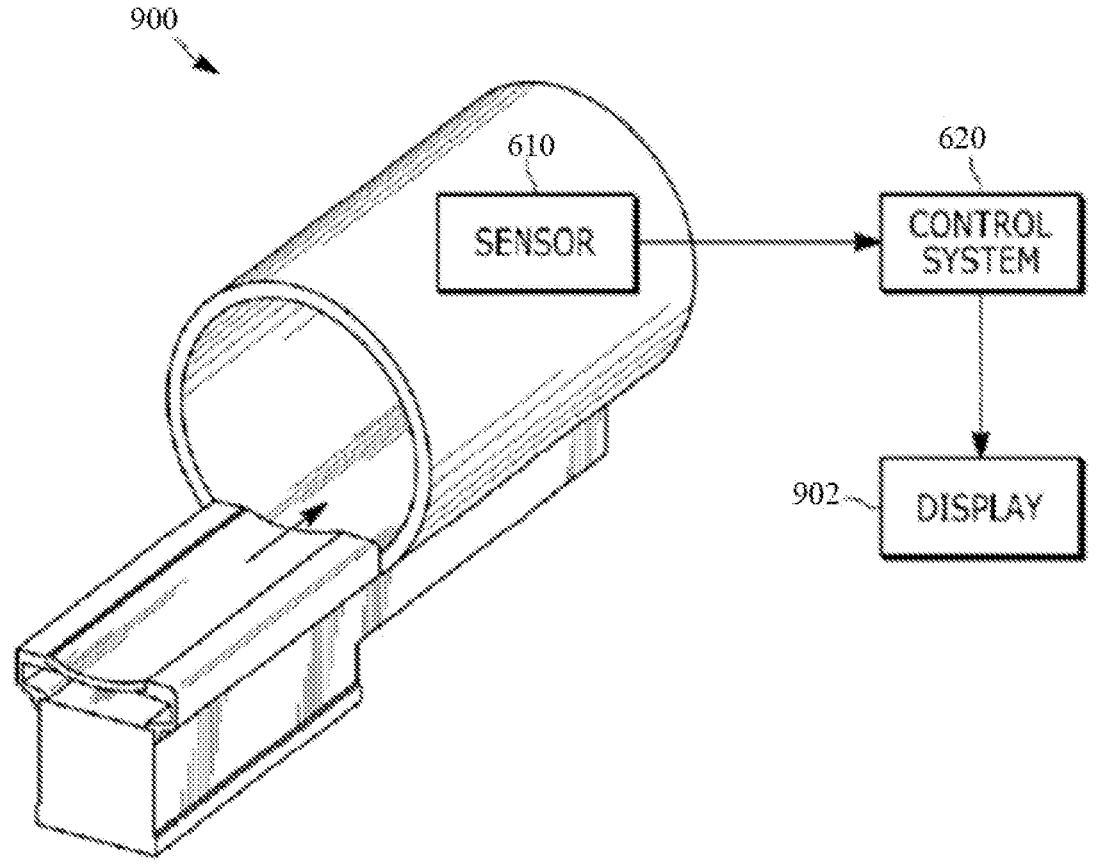
FIG. 9 is a diagram of the control system of FIG. 6 with respect to imaging technology according to an example embodiment of this disclosure.

FIG. 9 is a diagram of the system 600 with respect to imaging technology 900 according to an example embodiment. As a non-limiting example, the imaging technology 900 includes a magnetic resonance imaging (MRI) apparatus, an x-ray imaging apparatus, an ultrasonic apparatus, a medical imaging apparatus, any suitable type of imaging apparatus, or any number and combination thereof. In FIG. 9, the sensor system 610 includes at least one image sensor. The control system 620 is configured to obtain image data from the sensor system 610. The control system 620, via the framework 200, is also configured to generate semantic segmentation data based on the sensor data (e.g. image data). In addition, the control system 620 is configured to provide semantic segmentation data and object detection/recognition data with respect to the image data of the sensor system 610. In addition, the control system 620 is configured to display the any relevant data (e.g., sensor data, output data of the framework 200, relevant data from the computer vision application 680, or any number and combination thereof) on the display 902.

As described above, the embodiments are advantageous and provide a number of benefits. For example, the framework 200 provides a novel pixel representation learning approach for semantic segmentation. The framework 200 combines the self-supervised contrastive learning of the machine learning model 220 and the guidance of the pre-trained vision-language model 210 (e.g., CLIP) to learn consistent pixel embeddings with respect to visual and conceptual semantics. The framework 200 extends self-supervised contrastive learning from images to pixels by attracting each pixel embedding to its positive pairs and repelling it from negative pairs.

Also, the framework 200 is advantageous in enabling a new task, namely class-free semantic segmentation. This new task does not need any human annotations and even assumes no class names are given during training. This is a more challenging task than the recent work (e.g., MaskCLIP+) that requires class names of both known classes and unknown classes. For example, compared with MaskCLIP+, with respect to the new task, the framework 200 assumes unknown class names are not given during training. Also, the pixel embeddings of MaskCLIP+ are distorted by the predefined classes, which limits the ability of MASKCLIP+ to recognize unknowns. Also, MASKCLIP+ needs unknown class information during training, thereby hindering real-world applications.

In addition, the framework 200 exhibits consistent and substantial gains over other unsupervised and language-driven semantic segmentation methods on at least four datasets: Pascal VOC 2012, Pascal Context, and COCO-Stuff, and DAVIS 2017. Also, the framework 200 significantly outperforms the state-of-the-art with respect to the segmentation of unknown classes. Moreover, the framework 200 is configured to recognize unknown classes during inference time without knowing any unknown class information during training time, and also learns fine-grained and sharper pixel embeddings with self-supervision.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for language-guided self-supervised semantic segmentation, the method comprising:

receiving a source image;

generating a modified image by performing data augmentation on the source image, the modified image being a modified version of the source image;

generating, via a machine learning model, first pixel embeddings based on the modified image;

generating first segment embeddings using the first pixel embeddings;

generating, via a pretrained vision-language model, second pixel embeddings based on the source image;

generating second segment embeddings by applying segment contour data of the first segment embeddings to corresponding clusters of the second pixel embeddings after the data augmentation is performed on the second pixel embeddings;

generating embedding consistent loss data at least by comparing the first segment embeddings to the second segment embeddings;

generating combined loss data that includes the embedding consistent loss data;

updating parameters of the machine learning model based on the combined loss data; and providing a framework for language-guided self-supervised semantic segmentation, the framework including (i) the pretrained vision-language model and (ii) the machine learning model after the parameters have been updated.

2. The computer-implemented method of claim 1, further comprising:

generating another modified image by performing another data augmentation on the source image, the another modified image being another modified version of the source image;

generating, via the machine learning model, third pixel embeddings based on the another modified image;

generating third segment embeddings using the third pixel embeddings; and generating contrastive loss data by computing similarity data of the first pixel embeddings with respect to the first segment embeddings and the third segment embeddings, wherein the combined loss data further includes the contrastive loss data.

3. The computer-implemented method of claim 1, further comprising:

establishing a set of class prototypes that include at least (i) a first class prototype that is associated with a predetermined class in which a class name is given to the framework during training and (ii) a second class prototype that is associated with a placeholder class;

generating a pseudo-label for a particular second segment embedding of the second segment embeddings, the pseudo-label being defined by a particular class prototype having a greatest similarity to the particular second segment embedding, the particular class prototype being within the set of class prototypes;

generating a class prediction for a particular first segment embedding, the class prediction being selected from among the set of class prototypes based on greatest similarity measurement; and generating semantic consistent loss data by computing a cross-entropy of the class prediction relative to the pseudo-label, wherein the combined loss data further includes the semantic consistent loss data.

4. The computer-implemented method of claim 3, wherein:

the first class prototype is an average of a collection of various segment embeddings that are determined to be most similar to text embedding of the class name; and the second class prototype is (i) initialized by a random segment embedding that is selected from among the second segment embeddings and not associated with the predetermined class and (ii) updated by minimizing distance data between the random segment embedding and a group of other segment embeddings that are classified as belonging to the placeholder class.

5. The computer-implemented method of claim 1, wherein:

the pretrained vision-language model comprises another machine learning model that is trained to perform image classification with open vocabulary classes; and the machine learning model comprises at least one encoder.

6. The computer-implemented method of claim 1, wherein each first segment embedding is generated by computing an average of a cluster of the first pixel embeddings that are associated with a same visually coherent region.

7. The computer-implemented method of claim 1, further comprising:

receiving a digital image;

employing the framework in a computer vision application to recognize objects that are displayed in the digital image; and controlling an actuator based at least on the recognized objects.

8. A system for language-guided self-supervised semantic segmentation, the system comprising:

one or more processors;

at least one non-transitory computer readable medium in data communication with the one or more processors, the at least one non-transitory computer readable medium having computer readable data including instructions stored thereon that, when executed by the one or more processors is configured to cause the one or more processors to perform a method that comprises:

receiving a source image;

generating a modified image by performing data augmentation on the source image, the modified image being a modified version of the source image;

generating, via a machine learning model, first pixel embeddings based on the modified image;

generating first segment embeddings using the first pixel embeddings;

generating, via a pretrained vision-language model, second pixel embeddings based on the source image;

generating second segment embeddings by applying segment contour data of the first segment embeddings to corresponding clusters of the second pixel embeddings after the data augmentation is performed on the second pixel embeddings;

generating embedding consistent loss data at least by comparing the first segment embeddings to the second segment embeddings;

generating combined loss data that includes the embedding consistent loss data;

updating parameters of the machine learning model based on the combined loss data; and providing a framework for language-guided self-supervised semantic segmentation, the framework including (i) the pretrained vision-language model and (ii) the machine learning model after the parameters have been updated.

9. The system of claim 8, wherein the method further comprises:

generating another modified image by performing another data augmentation on the source image, the another modified image being another modified version of the source image;

generating, via the machine learning model, third pixel embeddings based on the another modified image;

generating third segment embeddings using the third pixel embeddings; and generating contrastive loss data by computing similarity data of the first pixel embeddings with respect to the first segment embeddings and the third segment embeddings, wherein the combined loss data further includes the contrastive loss data.

10. The system of claim 8, wherein the method further comprises:

establishing a set of class prototypes that include at least (i) a first class prototype that is associated with a predetermined class in which a class name is given to the framework during training and (ii) a second class prototype that is associated with a placeholder class;

generating a pseudo-label for a particular second segment embedding of the second segment embeddings, the pseudo-label being defined by a particular class prototype having a greatest similarity to the particular second segment embedding, the particular class prototype being within the set of class prototypes;

generating a class prediction for a particular first segment embedding, the class prediction being selected from among the set of class prototypes based on greatest similarity measurement; and generating semantic consistent loss data by computing a cross-entropy of the class prediction relative to the pseudo-label, wherein the combined loss data further includes the semantic consistent loss data.

11. The system of claim 10, wherein:

the first class prototype is an average of a collection of various segment embeddings that are determined to be most similar to text embedding of the class name; and the second class prototype is (i) initialized by a random segment embedding that is selected from among the second segment embeddings and not associated with the predetermined class and (ii) updated by minimizing distance data between the random segment embedding and a group of other segment embeddings that are classified as belonging to the placeholder class.

12. The system of claim 8, wherein:

the pretrained vision-language model comprises another machine learning model that is trained to perform image classification with open vocabulary classes; and the machine learning model comprises at least one encoder.

13. The system of claim 8, wherein each first segment embedding is generated by computing an average of a cluster of the first pixel embeddings that are associated with a same visually coherent region.

14. The system of claim 8, further comprising:

receiving a digital image;

employing the framework in a computer vision application to recognize objects that are displayed in the digital image; and controlling an actuator based at least on the recognized objects.

15. A non-transitory computer readable medium having computer readable data including instructions stored thereon, the computer readable data being executable by one or more processors to perform a method that comprises:

receiving a source image;

generating a modified image by performing data augmentation on the source image, the modified image being a modified version of the source image;

generating, via a machine learning model, first pixel embeddings based on the modified image;

generating first segment embeddings using the first pixel embeddings;

generating, via a pretrained vision-language model, second pixel embeddings based on the source image;

generating second segment embeddings by applying segment contour data of the first segment embeddings to corresponding clusters of the second pixel embeddings after the data augmentation is performed on the second pixel embeddings;

generating embedding consistent loss data at least by comparing the first segment embeddings to the second segment embeddings;

generating combined loss data that includes the embedding consistent loss data;

updating parameters of the machine learning model based on the combined loss data; and providing a framework for language-guided self-supervised semantic segmentation, the framework including (i) the pretrained vision-language model and (ii) the machine learning model after the parameters have been updated.

16. The non-transitory computer readable medium of claim 15, wherein the method further comprises:

generating another modified image by performing another data augmentation on the source image, the another modified image being another modified version of the source image;

generating, via the machine learning model, third pixel embeddings based on the another modified image;

generating third segment embeddings using the third pixel embeddings; and generating contrastive loss data by computing similarity data of the first pixel embeddings with respect to the first segment embeddings and the third segment embeddings, wherein the combined loss data further includes the contrastive loss data.

17. The non-transitory computer readable medium of claim 15, wherein the method further comprises:

establishing a set of class prototypes that include at least (i) a first class prototype that is associated with a predetermined class in which a class name is given to the framework during training and (ii) a second class prototype that is associated with a placeholder class;

generating a pseudo-label for a particular second segment embedding of the second segment embeddings, the pseudo-label being defined by a particular class prototype having a greatest similarity to the particular second segment embedding, the particular class prototype being within the set of class prototypes;

generating a class prediction for a particular first segment embedding, the class prediction being selected from among the set of class prototypes based on greatest similarity measurement; and generating semantic consistent loss data by computing a cross-entropy of the class prediction relative to the pseudo-label, wherein the combined loss data further includes the semantic consistent loss data.

18. The non-transitory computer readable medium of claim 17, wherein:

the first class prototype is an average of a collection of various segment embeddings that are determined to be most similar to text embedding of the class name; and the second class prototype is (i) initialized by a random segment embedding that is selected from among the second segment embeddings and not associated with the predetermined class and (ii) updated by minimizing distance data between the random segment embedding and a group of other segment embeddings that are classified as belonging to the placeholder class.

19. The non-transitory computer readable medium of claim 15, wherein:

the pretrained vision-language model comprises another machine learning model that is trained to perform image classification with open vocabulary classes; and the machine learning model comprises at least one encoder.

20. The non-transitory computer readable medium of claim 15, wherein each first segment embedding is generated by computing an average of a cluster of the first pixel embeddings that are associated with a same visually coherent region.

* * * * *